United States Patent [19]

Marion

[11] 3,797,987
[45] Mar. 19, 1974

[54] COEXTRUSION APPARATUS FOR FLAT FILM

[76] Inventor: George J. Marion, 691 E. Boot Rd., West Chester, Pa. 19380

[22] Filed: Feb. 4, 1972

[21] Appl. No.: 223,436

Related U.S. Application Data

[63] Continuation-in-part of Ser. No. 861,047, Sept. 25, 1969.

[52] U.S. Cl. ............................. 425/463, 425/466
[51] Int. Cl. ............................................. A01j 21/00
[58] Field of Search ........... 425/131, 462, 463, 464, 425/466

[56] References Cited
UNITED STATES PATENTS

| | | | |
|---|---|---|---|
| 3,611,492 | 10/1971 | Scheibling | 425/462 X |
| 3,293,689 | 12/1966 | Chiselko et al. | 425/466 |
| 3,684,422 | 8/1972 | Huesing | 425/466 |
| 3,005,440 | 10/1961 | Padday | 425/131 X |
| 3,302,239 | 2/1967 | Senecal | 425/131 |

*Primary Examiner*—R. Spencer Annear
*Attorney, Agent, or Firm*—Jackson, Jackson and Chovanes

[57] ABSTRACT

A dual outlet coextrusion flat film die assembly for various thermo-extrudable materials includes split manifold chambers separated from each other by a rigid plate that can include heat insulating means to prevent heat transfer between the manifolds. Each manifold is tapered toward its own die mouth; has separate melt inlets adapted for center, top or end feed operations; has separate pre-land and final land surfaces leading to individual outlet openings for precise control of melt flow; and has separate heat control means allowing precise temperature control for each melt as it flows throughout the die. Temperature differentials ranging from 0° to 200° F. are obtainable between the extruded layers. A differential push-pull adjustment system for a movable lip of each outlet opening includes opposed alternatingly staggered thimble bolts for precise control of each individual layer profile. Methods of laminating the extruded layers to each other as well as to other substrates are included.

24 Claims, 18 Drawing Figures

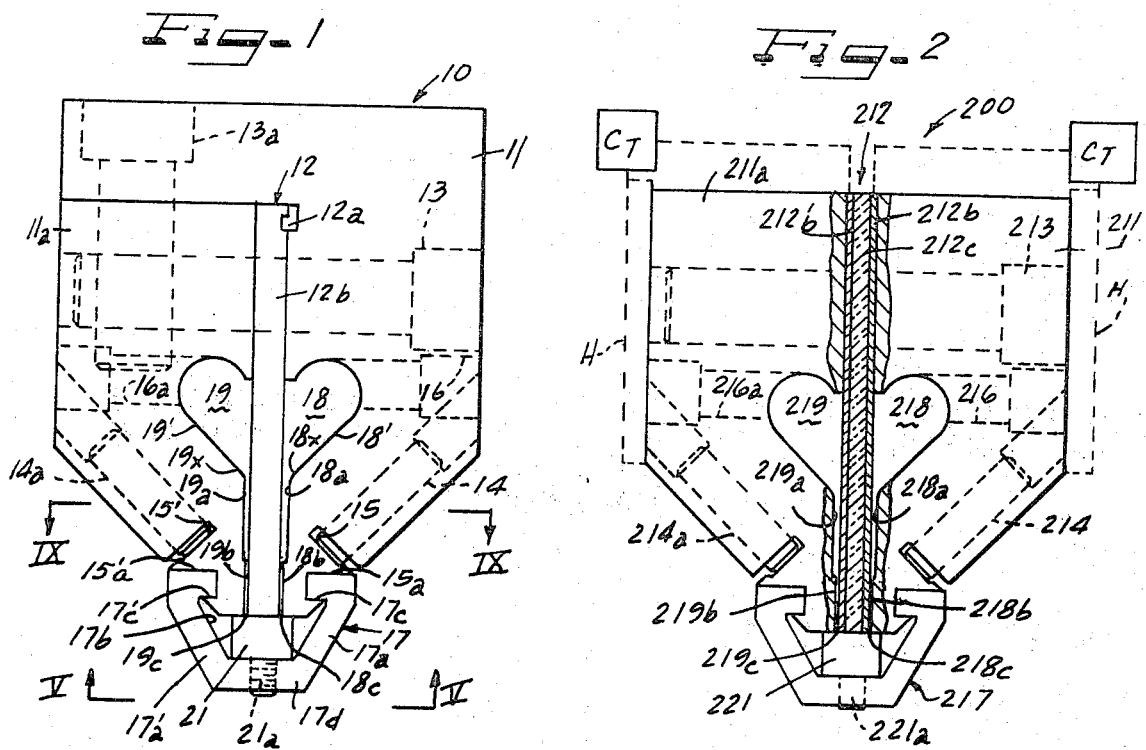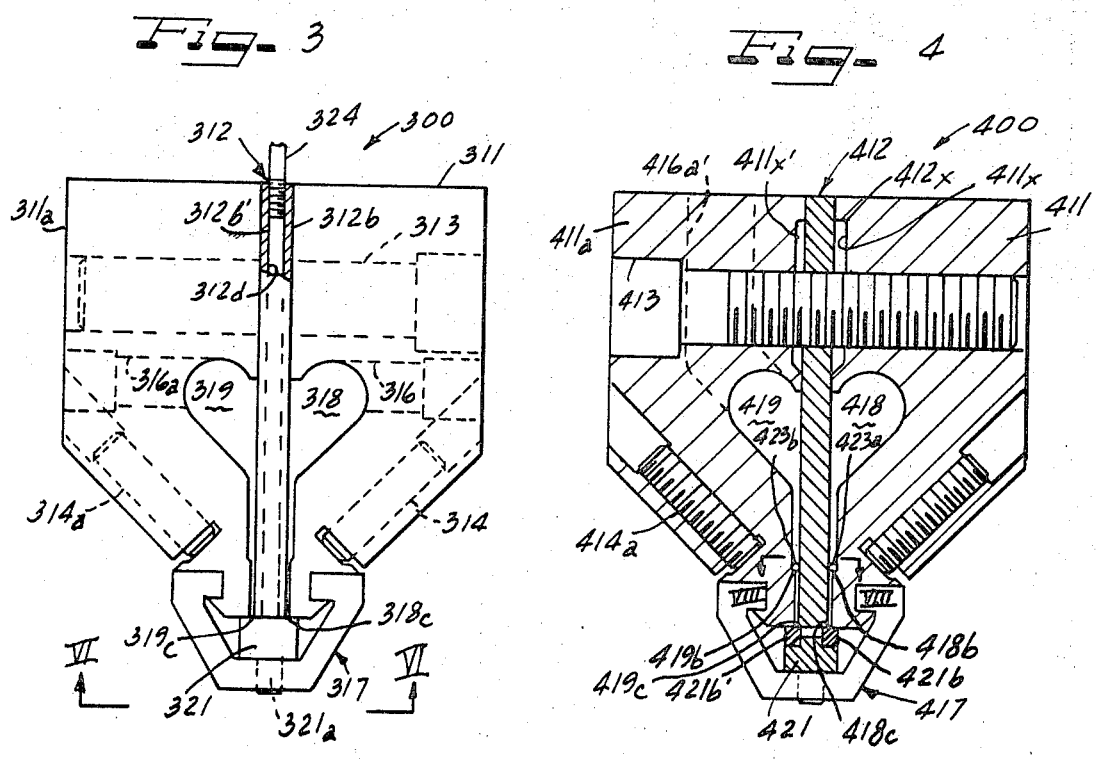

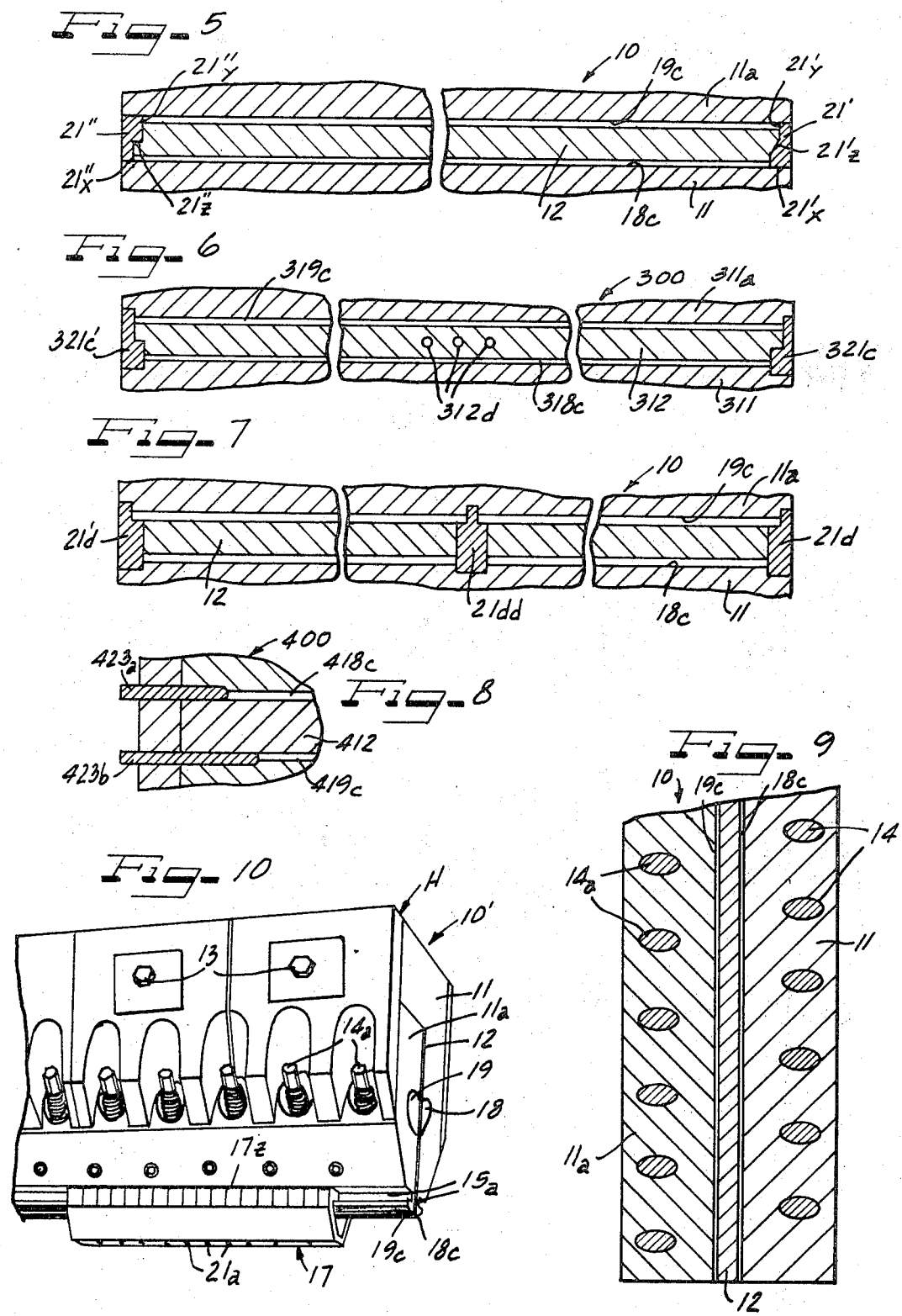

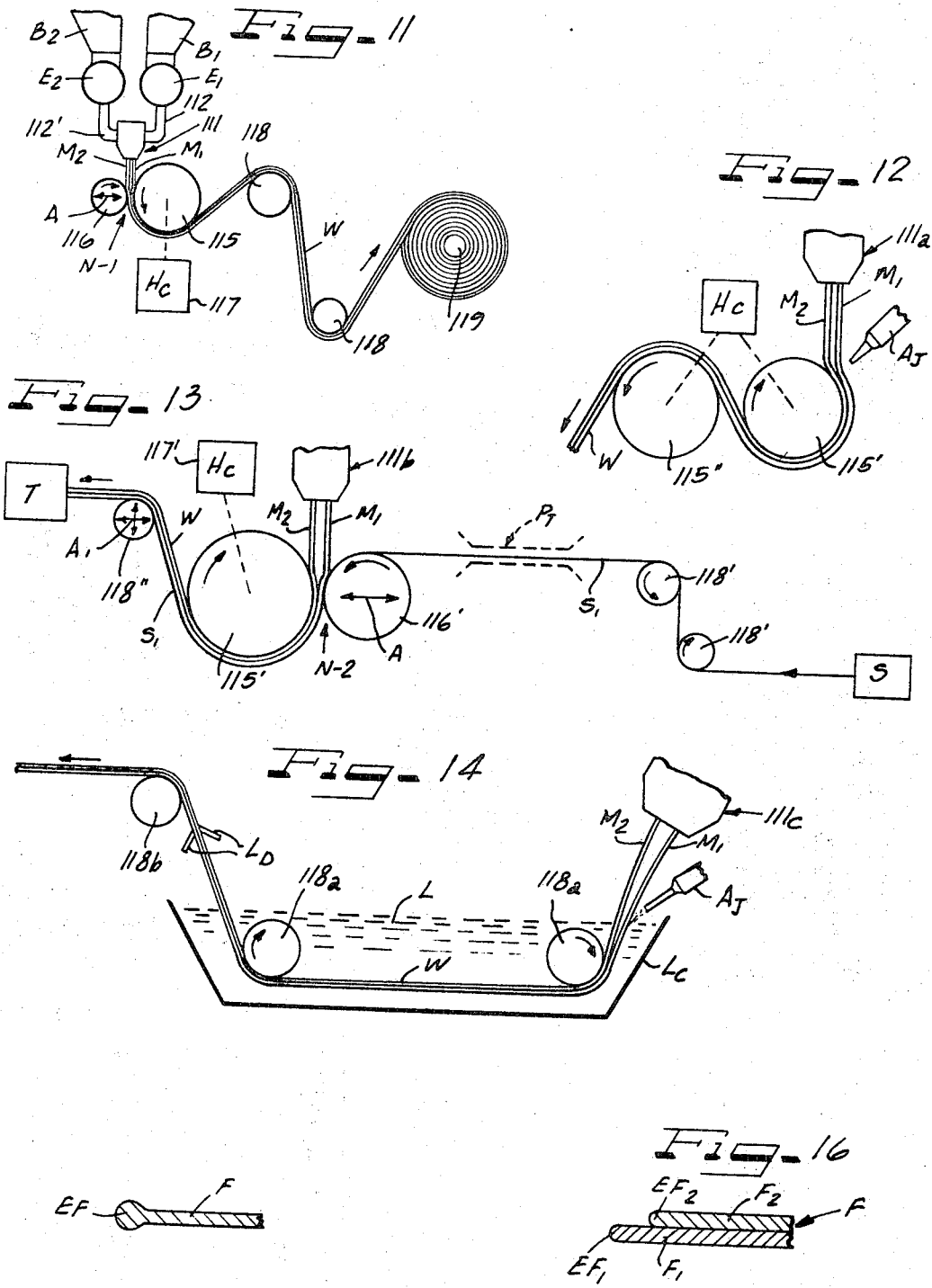

3,797,987

COEXTRUSION APPARATUS FOR FLAT FILM

CROSS-REFERENCE TO RELATED APPLICATION

This is a continuation-in-part application of my co-pending U. S. Ser. No. 861,047, filed Sept. 25, 1969, which is incorporated herein by reference.

BACKGROUND OF THE INVENTION

1. Field of the Invention

The invention relates to extrusion apparatus for producing films and more particularly to extrusion apparatus capable of coextruding two or more flat layers of materials laminatable to each other and/or other substrates.

2. Prior Art

Apparatus for the coextrusion of flat multi-layer films of at least certain thermo-extrudable material is known. Certain of such apparatus includes separate manifolds feeding individual melts to a common passageway so that contiguous boundaries between adjoining melts are formed and the resulting melt stream exists from the apparatus as a composite film. However, in such systems complex adjustments are necessary to achieve individual melt thickness control and only materials having similar resin rheology are usable. Further, individual temperature control for each melt in such systems is not readily attained, especially during flow along the common passageway. Other known apparatuses utilize a single manifold for receiving a plurality of melts and a special adapter within the manifold lines up the melt stream in a desired sequence. In such systems, the resins utilized must have about equal apparent melt viscosities in order to attain uniformity in thickness ratios and individual melt temperature control is not readily attainable because of the contiguous flow streams of the separate melts. Yet other known apparatuses produce composite blown film wherein different melts are combined inside or outside a die. Blown films require additional processing, i.e. collapsing of the bubble, slitting, folding, etc. and are thus considered relatively undesirable for the production of sheet products. Further, composite blown films do not exhibit sufficient bonding between the individual layers. Blown film dies wherein the different melts combine inside the die do not allow individual melt temperature and/or thickness control. Known blown film dies wherein the different melts combine outside of the die are incapable of adjusting the individual layer thicknesses or of regulating the temperature of each melt. All of the various known coextrusion flat-film apparatuses allow edge build-up on the extruded layers, which is highly undesirable and comprises waste.

It is an object of the invention to provide an improved coextrusion apparatus for flat film that includes precise temperature control for each melt, precise profile control for each extruded layer and avoidance of edge build-up.

SUMMARY OF THE INVENTION

The invention provides an economical and easily operable coextrusion flat-film apparatus for a wide range of thermo-extrudable materials, such as resins, waxes, etc. The apparatus includes a die body having at least a pair of streamlined manifold chambers, each of which has a separate inlet. Each manifold is tapered into a separate pre-land surface and final land surface for directing a melt toward a separate outlet opening or slot. A rigid plate is positioned between each manifold and associated pre-land and final land surfaces to maintain separate melt passages throughout the die body. The rigid centerplate is composed of a heat-resistant material, which in certain embodiments includes heat-insulating materials and/or heat sinks so that heat is not transferred from one manifold area to the other, across the plate. A plurality of individual heat control means are provided along each side of the die body in association with each manifold, pre-land and final land surfaces so that individual temperature control of each melt is achieved throughout the individual melt flow passages in the die body for improved bonding characteristics. In certain embodiments, opposite sides of the centerplate are provided with individually controllable heating means to insure that the melt within each flow passage experiences uniform temperatures on all sides thereof. Internal and/or external deckle means are utilized with the individual outlet slots to avoid edge build-up of the extruded layers. The deckle means selectively block the outlet slots by a predetermined amount for the material being extruded, generally depending upon the amount of neck-in occurring in an extruded layer of that material before solidification or support thereof. In certain embodiments, external deckle means are also provided along the length of the outlet slots for extrusion of a plurality of ribbons. The lower portion of each final land surface is flexible and opposing alternatingly staggered thimble adjustment bolts are provided on each side of the die body in the vicinity of each of the outlet slots for precise profile control of each extruded layer thereby minimizing hills and valleys within the individual layers. In certain embodiments, gas passageways are provided through the centerplate for feeding an oxidizing gas or the like between the extruded layers for improved bonding between certain extrudable materials.

Methods of laminating the extruded layers to each other as well as to various different substrates are also provided by the invention. The differential heating of the extruded layers allows, for example, the layer contacting a substrate to be heated to a somewhat higher temperature than the outer layer whereby better bonding between the substrate and layers occurs at a lower overall heat level and at less deterioration to the composite film.

BRIEF DESCRIPTION OF THE DRAWINGS

An understanding of further particulars of the invention may be obtained from a consideration of the following detailed description of representative embodiments thereof, taken in conjunction with the accompanying figures in the drawings, of which:

FIG. 1 is an elevational diagrammatic view of an embodiment of the apparatus of the invention;

FIG. 2 is an elevational view, partially in section, of another embodiment of the apparatus of the invention;

FIG. 3 is an elevational view, partially in section, of yet a further embodiment of the apparatus of the invention;

FIG. 4 is an elevational sectional view of yet another embodiment of the apparatus of the invention;

FIG. 5 is a fragmentary partial bottom sectional view taken along the line V—V of FIG. 1;

FIG. 6 is a partial fragmentary bottom sectional view taken along the line VI—VI of FIG. 3;

FIG. 7 is a view somewhat similar to FIG. 5 but of a different embodiment of the invention;

FIG. 8 is a partial fragmentary bottom sectional view taken along line VIII—VIII of FIG. 4;

FIG. 9 is a partial sectional view taken along the line IX—IX of FIG. 1;

FIG. 10 is a partial perspective view of an embodiment of the apparatus of the invention;

FIG. 11 is an elevational diagrammatic view illustrating a method embodiment of the invention for producing a composite film;

FIG. 12 is an elevational diagrammatic view illustrating another method embodiment of the invention for producing a composite film;

FIG. 13 is an elevational diagrammatic view illustrating a method embodiment of the invention for laminating the coextruded layers onto a substrate;

FIG. 14 is an elevational diagrammatic view illustrating yet another method embodiment of the invention for producing a composite film;

FIG. 15 is a partial cross sectional view of edge build-up at one side of an extruded film formed by prior art;

FIG. 16 is a view somewhat similar to FIG. 15 but illustrating a partial cross sectional view of an edge of solidified film layers formed by the invention;

DESCRIPTION OF THE PREFERRED EMBODIMENTS

Figure 17:
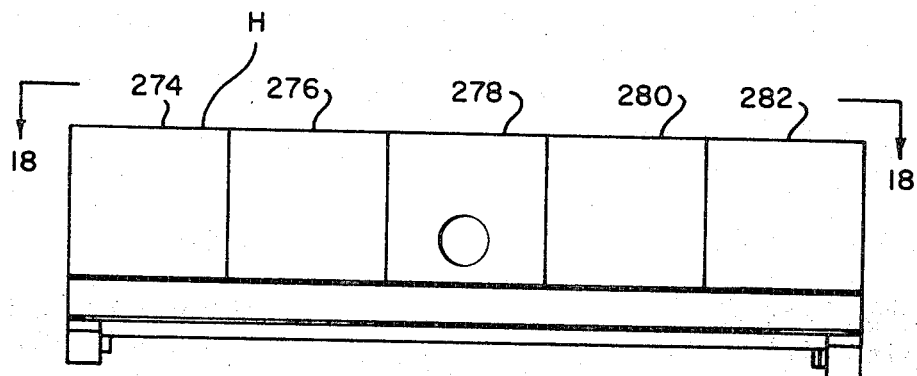
FIG. 17 is a diagrammatic side elevational view, to a different scale, of a form having heating means on a given side including a plurality of separate individual resistance heaters, such as might for example be used as H in FIG. 2 or might especially be used for for example as a particular feature of a form otherwise more like that of FIG. 1, viewed from the right hand side of the figure in each case and shown in solid rather than dotted lines as with FIG. 2.

The invention provides a coextrusion apparatus for flat film wherein precise temperature and thickness control for each extruded layer is achieved and edge build-up is substantially eliminated.

Coextrusion is defined herein as a single extrusion process that combines two or more of the same or different thermo-extrudable materials, such as thermoplastic resins, waxes, hotmelt adhesives, etc. in a molten state into a composite film that is ready for use as such or is bonded to another substrate. The apparatus embodiments of the invention include a die body having a plurality of manifold chambers separated from one another by a rigid portion extending between the chambers. Each chamber is streamline tapered toward its own outlet opening and is provided with separate pre-land and final land surfaces, extending sequentially toward separate outlet openings or slots for improved melt flow control. A plurality of separate manifold chambers, preland and final land surfaces as well as separate outlet slots provides improved throttling of each melt, improved layer thickness control and overall layer ratio control by separate, precise adjustments of each of the lip portions adjacent each outlet slot. Opposed alternatingly staggered thimble bolts are associated with each of the outlet slots for precise profile control of each extruded layer. Heat control means are associated with each melt flow passage within the die so that the temperature of each melt is fully and independently regulated throughout its flow within the die body.

Deckle means, external, internal or a combination thereof, are associated with each of the outlet slots in an offset manner from one another to substantially eliminate edge build-up along the width of the extruded layers, that otherwise occurs in extruded flat film. The external deckle means comprises an open boat-type carrier member that straddles the outlet slots at selected locations along the length thereof, as at the end edges of such slots and holds a deckle block member having offset end portions in sealing relation against the slots, so that different width layers are extruded from each slot. In this manner, each extruded layer has less than half of the bead dimension that is present on non-deckled films or on uniformly deckled films. The internal deckle means comprises rod-like members associated with the final land surfaces of each outlet slot and extend inwardly different amounts for each outlet slot so that different width layers are extruded from each opening. Internal and external deckle means can be combined on a single die body.

A wide variety of thermo-extrudable materials can be coextruded in accordance with the principles of the invention. Thermoplastic resins of diverse melt indexes and/or melt rheology are readily coextrudable in accordance with the invention and include, for example; acrylonitrile-butadiene-styrene copolymers, acetyl homopolymers and copolymers, acrylic polymers, cellulistic polymers, ethyl acylic ester polymers, ethyl vinyl acetate polymers, fluoroplastic polymers, ionomer polymers, methyl pentane polymers, polyamide (nylon) polymers, phenoxy polymers, polyallomer copolymers, polycarbonate polymers, polyethylene polymers, polyester polymers, polyimide polymers, phenylene oxide polymers, polypropylene polymers, polystyrene polymers, polysulfono polymers, polyvinyl chloride polymers, polyvinylene chloride polymers, polyurethane polymers, etc. These resins can include foaming agents, coloring additions, anti-friction additives, etc. Further, certain of the resins may be in expanded form, as foamed resins. Other thermo-extrudable materials coextrudable in accordance with the principles of the invention include, for example, natural and synthetic waxes, paraffins, hotmelts, adhesives, coloring agents, etc.

Referring now to the embodiment illustrated at FIG. 1, a die body 10 is comprised of a first body portion 11 and a second portion 11a, which are assembleable into a single body formed of two mirror-image portions. Such mirror-image portions are economically manufactured and reduce the overall cost of the die body 10. Of course, if desired, the die body 10 may be formed of a single monolithic body or comprised of two closely adjacent portions. The body portions 11 and 11a are rigidly held in assembly by bolt means, and an exemplary horizontal bolt 13 and an exemplary vertical bolt 13a are shown.

A centerplate member 12 extends downwardly in a machine direction and is positioned between the body portions 11 and 11a and is of an essentially rectangular shape for ease of machining. A key-like member 12a locks the plate 12 along its upper portion with an appropriately shaped groove or the like in body portion 11. Other means of securing the plate to the body portions can also be utilized, for example, the plate may be L-shaped for clamping between the body portions or bolts or the like may be utilized to secure the plate to one of the body portions. The centerplate member 12 is composed of a heat-resistant material 12b, preferably of metal, such as stainless steel, aluminum, an alloy, etc. and the side surfaces thereof are smooth and highly polished.

Melt inlet passages 16 and 16a respectively are provided in each of the body portions 11 and 11a in a direction transverse to said machine direction. In the embodiment shown at FIG. 1, the inlet passages 16 and 16a are adapted for center feed operation. If desired, melt inlet passages can be adapted for end or top feed operation. Extruder conduits or connecting adapters 112 and 112' respectively (best seen in FIG. 11) interconnect inlet passages 16 and 16a with at least one extruder providing a thermo-extrudable material and preferably with a plurality of extruders providing a different melt to each inlet passage. The die body of the invention can be connected to extruders by means of machined rigid connecting adapters or by flexible coupling adapters formed of standard hydraulic stainless steel tubing, such as capable of withstanding pressures of about 10,000 psi. While the inlet passages 16 and 16a are illustrated as being horizontally orientated, angular and vertical orientation, such as illustrated at FIG. 4, are within the scope of the invention.

Manifold chambers 18 and 19, respectively, extend in a cross-machine direction and are disposed within each of the body portions 11 and 11a so that the inner boundary of each chamber is defined by the centerplate member 12. The manifold chambers 18 and 19 are somewhat streamlined and tapered downwardly toward the centerplate 12. The boundaries of the chambers 18 and 19 extend into the body portions 11 and 11a respectively, and are somewhat tear-shaped for improved flow characteristics of melts therein and for improved heat distribution. Each of the manifold chamber outer walls 18' and 19' taper toward points 18x and 19x respectively, directing the melt flows within each of the chambers toward the centerplate 12. Pre-land surfaces 19a and 18a join the outer walls 18' and 19' of each chamber at points 18x and 19x respectively. The pre-land surfaces 18a and 19a cooperate with opposite side surfaces of the centerplate 12 to define first relatively narrow melt flow passages for coarse throttling or control of each melt stream. Final land surfaces 18b and 19b, respectively, join the preland surfaces 18a and 19a and in cooperation with the side surfaces of centerplate 12 define second relatively narrower melt flow passages for fine throttling or control of each melt stream. The final land surfaces 18b and 19b terminate at the bottom of die body 10 and in cooperation with the terminal end of the centerplate 12 define at least a pair of side-by-side outlet slots 18c and 19c, respectively. The outlet slots 18c and 19c are spaced apart but relatively close to one another so that the extruded melt layers may be readily bonded to one another or to a substrate while still in their molten state. The manifold chambers 18 and 19, the pre-land surfaces 18a and 19a, the final land surfaces 18b and 19b and the outlet slots 18c and 19c extend substantially along the entire length of the die body 10 and are closed from ambient environment along their ends by a pair of end plates (not shown).

A pair of relatively deep narrow grooves 15 and 15' are provided along the respective outer walls of the die body portions 11 and 11a. The grooves 15 and 15' extend inwardly along each body portion for a given distance at approximately a 45° angle to the centerplate. This configuration of the grooves 15 and 15' toward the pre-land surfaces 18a and 19a, respectively, allows the body portions below the grooves to move in respect to the body portions above the grooves. Since the upper and lower body portions are formed from a unitary piece of material, inherent strength and flexibility of such portions is assured. Certain prior art arrangements include movable lips on a die but are composed of a plurality of separate pieces and thus lack inherent strength and flexibility of a unitary body.

Adjustable thimble bolts 14 and 14a are positioned within the body portion above the grooves 15 and 15' so as to have their inner ends abut against the lower groove walls for selectively moving the body portions below such grooves toward and away from one another and thereby adjust the width and profile of the outlet slots 18c and 19c respectively. As best seen in FIG. 9, the thimble bolts 14, 14a are in an opposing alternatingly staggered relation to each other along the length of the die body. This arrangement is contrary to conventional die lip adjustment means and eliminates hills and/or valleys in each of the extruded layers so that a substantially uniform caliber of composite film is produced.

A pair of relatively shallow grooves 15a and 15'a, respectively, are provided along the respective outer walls of body portions 11 and 11a and positioned below the grooves 15 and 15' but above the outlet slots 18c and 19c. The grooves 15a and 15'a extend inwardly substantially perpendicularly to the final land surfaces 18b and 19b and accommodate an external deckle bar carrier member 17. While only one deckle bar carrier member is shown, a plurality of similar members can be provided along the length of the die body and in certain preferred embodiments at least a pair of such carrier members are utilized, one at each end of the die body. Since the carrier members are all essentially identical in construction, only one carrier member 17 will be described in detail.

The deckle bar carrier member 17 is generally referred to as a "boat" deckle and is preferably formed from a single piece of relatively strong heat-resistant material, such as metal. The boat deckle or carrier member 17 includes a pair of upwardly extending arms 17a and 17a', respectively, which terminate in inwardly turned ends 17c and 17c', respectively, to be slidably received in grooves 15a and 16a, respectively. Means for selectively moving the deckle boat along the length of the die body may be provided (not shown) so that the deckle boat may be precisely moved to a desired location and positively locked in place at such location.

The deckle boat 17 is formed with a somewhat U-shaped recess 17b having a bottom wall 17d opposite the outlet slots 18c and 19c respectively. A deckle bar 21 is formed so as to be received within the recess 17b for limited reciprocal movement toward and away from the outlet slots 18c and 19c. The deckle bar 21 is shown as being a solid body, such as of a suitable heat-resistant metal, however, in other embodiments, such as shown in FIG. 4, one or more strips of packing 421b and 421b' are securely positioned on a metal body 421 and biased against the outer surfaces of outlet slots 18c and 19c. Such packing strips are formed of any suitable heat-resistant frictionless material, such as asbestos impregnated with graphite or polytetrafluoroethylene.

Means for regulating the pressure or sealing force of bar 21 against the outlet slots 18c and 19c includes a plurality of set screws 21a which are externally threaded through the bottom wall 17d of deckle boat 17. Other means include the use of biasing members between the packing strips and their support bodies.

As indicated earlier, end plate members are suitably secured, as by bolts, on each end of the die body 10 so as to prevent the melt from escaping the confines of the die body. Means for regulating the heat along each of the melt flow passages throughout the die are operationally attached to the die body and provide an independent temperature for each melt as desired. Suitable heating means include resistant heaters, such as cast-in aluminum heaters that are comprised of, for example, an electrical heating element cast into an aluminum jacket for attachment to desired positions on the die body. Other heating means include a plurality of flow passageways for circulating a heating media within select portions of a die body. The heating means allows a select temperature differential to exist between the melt extruded from the respective outlet slots, say of 0° to 200° F. Such heat differential provides improved bonding characteristics between various thermoextrudable materials and/or between such materials and various substrates.

Referring now to the embodiment illustrated at FIG. 2, a die body 200 is comprised of a plurality of elements, each referred to by a reference numeral that is identical to the number utilized in discussing similar elements of die body 10 at FIG. 1, except that the instant numerals are in the 200 series. Thus, the die body 200 is comprised of die body portions 211 and 211a, respectively. Tapered manifold chambers 218 and 219, respectively, are positioned within their respective body portions 211 and 211a and provided with individual melt inlets 216 and 216a. The tapered somewhat tear-shaped configuration of the manifolds 218 and 219 provide for improved heat distribution within a melt in such manifolds and also provides relief of extrusion pressure. The pre-land surfaces 218a and 219a, respectively, final land surfaces 218b and 219b, respectively, and outlet slots 218c and 219c, etc., are all essentially identical to similar portions of the die body discussed at FIG. 1 so that no additional discussion of such like parts is necessary.

One important difference between the embodiments illustrated at FIGS. 1 and 2 resides in that centerplate member 212 of die body 200 is comprised of a pair of opposing metal plates 212b and 212b' separated by heat-insulating means, such as a sheet of asbestos 212c. The width dimension of centerplate member 212 varies from embodiment to embodiment but is generally relatively thin, such as about 0.25 to about 1.5 inch. In certain embodiments, the metal plates 212b and 212b' include an embedded heating element (not shown) that is operationally connected to a controllable heat-energy source $C_T$, as shown by the dotted lines. The asbestos sheet 212c prevents any substantial heat transfer across the centerplate member 212. Other heating means H are also operationally associated with the die body 200 and are operationally connected to an energy source $C_T$. It will be noted that each side of the die body has a separate controllable energy source $C_T$, for example, a rheostat-like control connected to an electrical power source. Heating means H comprises a plurality of separate individual resistance heaters, each connected to a controllable heat-energy source $C_T$ so that different portions of the die body can receive selective amounts of heat, such as an increased amount of heat at one or both ends thereof to insure that the melt has the same flow characteristics across the entire length of the die body.

Figure 18:
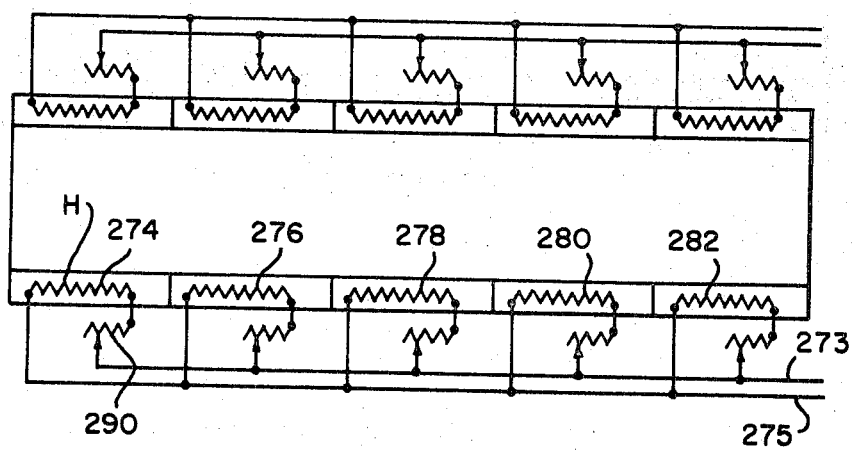
FIG. 18 is a diagrammatic view in plan along the line 17—17 of FIG. 4, to show the electrical heating system involved more specifically.

A description of an example of such heating means comprising a plurality of separate individual resistance heaters, each connected to a controllable heat-energy source, was already of record in the U.S. Patent Office in my parent U.S. patent application Ser. No. 861,047 filed Sept. 25, 1969, already mentioned as incorporated by reference herein, and for convenience of reference is shown in FIGS. 17 and 18 herein.

In such a case a heater H on its particular side can as indicated therein be made up of a group of individual heaters, adapted to cause heat to flow into the die body from its particular side. Each group would be made up of a number of individual heaters, exemplified in the case of the group shown by heaters 274, 276, 278, 280 and 282 (see FIGS. 17 and 18), using a similar set on the opposite side to make up the other group, though of course the number of heaters on a particular side would not necessarily be five, but might for example quite often be more. Each individual heater should for best results be individually controlled. The individual heaters shown in FIG. 17 are resistance heaters, such as cast-in-aluminum heaters and are each controlled by their own individual rheostats, as at 290 in the case of heater 274, in series with the heater across the electric power leads 273 and 275.

In the embodiment illustrated at FIG. 3, a die body 300 is provided with essentially identical elements discussed in conjunction with the die body 10 at FIG. 1 so that like elements have the same reference numerals in the 300 series. Accordingly, no further description of such like elements is necessary.

A notable difference in the present embodiment from that illustrated at FIG. 1 resides in the centerplate 312. The centerplate member 312 is comprised of a pair of opposing solid metal portions 312b and 312b' having one or more openings 312d therebetween which extend from the top to the bottom of the die body 300.

In certain specific forms of this embodiment, opening 312d comprises an uninterrupted air space between the metal portions 312b and 312b' that insulates one of the manifold chambers 318 from the other of the manifold chambers 319 so that little, if any, heat transfer takes place between such manifold chambers. Such a construction may be considered to comprise two single slot dies adapted for relatively close positioning to one another so as to feed two melt streams to a single bonding or coating station and such an arrangement of single slot die bodies are within the scope of the instant invention. Preferably, a single deckle boat 317 is associated with such a die assembly so that deckle bar 321 selectively blocks portions of each outlet slot 318c and 319c to avoid edge build-up. However, if desired, separate deckle boats and bars may be provided for each die.

In certain other forms of the embodiment shown at FIG. 3, one or more gas feed pipes 324 are threaded into a plurality of appropriate sleeves or openings 312d along the length of the centerplate member 312. Generally, an oxidizing gas, such as oxygen, ozone, nitrogen oxides, sulfur oxides, halogens, etc. with or without an inert diluent, such as nitrogen, is provided from a suitable source (not shown) at a controlled rate so as to contact the inner surfaces of the extruded melt layers and then react with at least one of such melt layers to alter its chemical and/or physical properties for improved bonding characteristics between such melt layers. Additionally, certain monomers, such as styrene, vinyl chloride, butadiene, etc. are vaporizable and provide an excellent gas for improved bonding of certain dissimilar melts, such as of nylon and of polyethylene. A corona discharge may be provided in the gas space between the melt layers immediately below the outlet slots for further improved bonding. Suitable electrodes are operationally attached along the bottom wall of centerplate member 312 and connected to a source of high-frequency alternating potential so as to generate a corona discharge that effects at least one surface of the extruded melt layers. The gas feed through pipes 324 are distributed along the entire length of the centerplate member 312 or only along select portions thereof, such as along the center portion, as best seen in FIG. 6. The oxidizing gas or the like is circulated throughout the die body and into the space below the outlet slots by being fed into certain of the through pipes and withdrawn from certain of the other through pipes.

If desired, the feed pipes 324 may be suitably interconnected along their bottom portions so that a heating fluid or the like can be circulated throughout the centerplate for maintaining a desired temperature along the respective inner walls of the melt flow passageways within the die.

The embodiment illustrated at FIG. 4 is likewise similar to the embodiment of FIG. 1 so that like elements have like reference numerals, in the 400 series. For a description of such like elements, reference is made to the discusssion relating to the other embodiments discussed hereinabove. A number of differences exist between the embodiments shown in FIG. 4 and the heretofore discussed embodiments. One such difference resides in the provision of a heat sink 412x for centerplate 412. The heat sink 412x comprises a pair of opposing sink-cavities 411x and 411x', respectively, each being formed in its respective body portion 411 and 411a. The sink-cavities 411x and 411x' extend substantially the entire length of the die and are positioned slightly above an upper periphery of the manifold chambers 418 and 419 so as to extend upwardly therefrom and terminate some distance below the top of die body 400. The actual dimension of such sink-cavities varies in accordance with the dimension of a die body and is generally of a sufficient dimension to entrap heat from one side of the centerplate member 412 and prevent any substantial portion thereof from being transferred to the other side thereof. The heat sink 412x provides a further means of establishing the desired temperature differential between the separate melts in their respective flow passageways throughout the die body.

Another difference is that internal deckle rods 423a and 423b, respectively, are positioned at the juncture of pre-lands 418a, 419a and final lands 418b, 419b and extend inwardly a preselect distance (best seen in FIG. 8) so as to vary the width of each of the flow passageways available for the respective melts and thereby reduce and/or eliminate edge build-up in the extruded layers. In certain forms of this embodiment, such internal deckle rods are utilized in place of external deckle bars, however, in other forms, such internal deckle rods are utilized in combination with external deckle blocks, as shown to provide more concise control of edge build-up. The internal deckle rods 423a and 423b are composed of a heat-resistant material, such as a metal and generally comprise cylindrical bodies terminating in a rounded end. The rods may include shaped side surfaces for varying the cross section of the space between such side surfaces and the final land surfaces for additional control of melt flow along the edges of the layers being extruded. The external deckle here comprises a deckle boat 417 substantially similar to that described earlier and having a body 421' positioned therein. Body 421' is formed so as to have a pair of grooves along the upper surface substantially in registry with the outlet slots 418c and 419c, respectively, and packing strips 421b and 421b' are force fitted within said grooves and biased against portions of the outlet slots so as to seal the same for select offset amounts to avoid edge build-up.

Edge bead and/or edge build-up is one of the most serious problems encountered in the extrusion of flat films or sheets and generally comprises the non-uniform thickness of the extruded sheet throughout the widths thereof, particularly at the edges thereof. The thickness of the edge bead can be 300 to 500 percent greater than the caliber or thickness of the sheet at its center portion (see FIGS. 15 and 16 for a partial cross sectional view of edge beads in accordance with the prior art and in accordance with the instant invention respectively). This is, of course, highly undesirable and edge beads are trimmed and discarded as waste, because generally two or more melt materials are intermixed within such beads. Of course, when such extruded sheets are coated onto a substrate, the edge portions of the substrate must also be trimmed and discarded. This is extremely uneconomical. Causes of edge build-up vary with various thermo-extrudable materials, melt temperatures, viscosity or melt indexes, densities, surface tension effects, etc. Since substantial economical advantages would result from the elimination and/or reduction of edge build-up, various attempts to eliminate edge beads have been made, generally without success. The combination of improved heat distribution and regulation within the individual melt streams in the die body and the deckle means provided in accordance with the principles of the invention, substantially eliminates or in certain instances reduces by a factor of about 50 percent, edge beads otherwise present on extruded flat film.

Referring now in further detail to the deckle means of the invention, FIG. 5 illustrates certain specific embodiments of deckle bars 21, shown in working relation with a die body 10 having outlet slots 18c and 19c, respectively. In the right hand embodiment, deckle bar 21' is formed so as to have a stepped inner side edge or face comprised of a first step 21'x and a second step 21'y, joined to the first step by a gradual or sloping juncture 21'z. The steps 21'x and 21'y seal off different lengths of each outlet slot 18c and 19c so that the extruded sheets have offset widths or side edges. Such deckle bars substantially eliminate edge beads with most thermo-extrudable materials and in others cause a reduction of edge bead so that when the offset edges of the extruded sheets are bonded together or onto a substrate, the two offset edges cannot combine and the variation in thickness at such edges is very minor and very little, if any, extruder trim is required. In the left handed embodiment, deckle bar 21" is formed somewhat similarly to deckle bar 21' and has a stepped inner side edge or face comprised of a first step 21"x and a second step 21"y, joined to the first step by a sharp or straight juncture 21"z. Since the steps 21"x and 21"y are offset from each other and are aligned so as to overlap or seal only one of the outlet slots 18c or 19c, respectively, the edges of the sheets extruded therefrom is likewise offset. Deckle bars 21' and 21" are utilizable on opposite ends of the same die body so that the resultant composite film has opposingly staggered side edges, allowing one side to be trimmed of one material and the other side to be trimmed of another material, whereby both materials can be recycled as desired so that no waste results. Of course, an opposing pair of deckle bars 21' or 21" may also be utilized on a single die body and only the same material be trimmed from both sides of the resulting composite film.

FIG. 6 illustrates a pair of opposing deckle bars 321c and 321c' positioned in working relation to outlet slots 318c and 319c, respectively, of die body 300. The stepped inner faces of deckle bars 321c and 321c' are so formed that each step only overlaps or seals a single outlet slot whereby staggered sheet end edges are produced. The deckle bars 321c and 321c' are somewhat different from the earlier discussed deckle bar embodiments in that the cross-machine end edges thereof extend beyond the side boundaries of the outlet slots. Such deckle bar construction is more economical since a greater dimension tolerance, at least at the cross-machine direction is permitted. In the arrangement here shown, centerplate 312 has a plurality of gas feed pipes 312d arranged along at least the center portion of the die body for the introduction of an oxidizing gas or the like between the extruded molten sheets as explained in conjunction with FIG. 3.

FIG. 7 illustrates a plurality of deckle bars 21d, 21d' and 21dd positioned in working relation to outlet slots 18c and 19c of die body 10. The stepped inner faces of deckle bars 21d and 21d' are essentially similar to that described earlier but deckle bar 21dd has both of its side edges or faces stepped in the manner earlier described. With a plurality of deckle bars, a plurality of ribbon-like sheets can be simultaneously extruded whereby one or more ribbons can be formed into a composite multilayer film while another ribbon is being coated onto a substrate. Of course, the deckle bars are provided in various lengths so that a desired sheet width is readily attainable from a single die and any number of deckle bars may be utilized to provide a plurality of relatively narrow ribbons.

FIG. 8 is a partial view of one side of a die body 400 having outlet slots 418c and 419c, respectively, that are partially sealed or blocked at their ends by internal deckle rods 423a and 423b, respectively. Opposing pairs of deckle rods 423a and 423b are inserted from opposing ends of the die body at the approximate juncture of the pre-land surfaces and final land surfaces. Each deckle rod is inserted a preselected distance into the die, in accordance with the material being extruded from that particular outlet of the die so as to provide offset side edges in the extruded layer substantially as explained hereinbefore. A die may utilize only internal deckle rods or may utilize a combination of internal and external deckle means for substantial elimination of edge build-up.

FIG. 9 illustrates a portion of a die body 10 comprised of body portions 11 and 11a and centerplate member 12 so as to define a pair of closely adjacent outlet slots 18c and 19c wherein thimble bolts 14 and 14a are uniformly staggered on opposite sides of the die body for selective movement of each outer wall of each of the die slots. Thimble bolts 14 and 14a allow precise control of each layer of thickness and because of the uniform staggered relation, allow elimination or reduction of hills and valleys in the composite extruded film so that a substantially uniform caliber of film or coating is readily attained along the entire width of the die. The width of each outlet slot is precisely and uniformly adjustable by selective movement of the outer wall thereof so that uniform gauge thickness can be maintained between the film. The gauge thicknesses range normally from about 0.1 to 10 or more mils (0.001 to 0.01 inches).

FIG. 10 is a partial perspective view of a die body 10' constructed in accordance with the principles of the invention, with an end plate removed for the sake of clarity. The die body 10' is somewhat rectangular in configuration, with convergingly sloping bottom walls that terminate in a pair of closely adjacent outlet slots 18c and 19c. A deckle boat 17 is mounted for selective movement along grooves 15a situated above the outlet slots. The deckle boat may be provided with indicia markings along visible surfaces thereof, such as distance indicia so that an operator can readily determine the position of the deckle boat in relation to the die body. The deckle boat 17 includes means for positively moving and securing the same to a given location along the length of the die body, such as means 17z. A plurality of heating plates H are secured along the side portions of the die body and are appropriately connected to an energy source (not shown) so that each heating plate H can be independently regulated to provide a desired amount of heat to its portion of the die body.

The heating means associated with the die body provide precise temperature control of each melt throughout its flow passages within the die. Each of the heating means is independently controllable and substantial temperature differential between adjacent melts is readily attained. This is an important feature of the invention since it allows one melt to be heated to a substantially greater temperature while the other melt is maintained at a relatively lower temperature. This feature not only allows completely different thermoextrudable materials to be coextruded but also, during coating operation, allows the melt to be directly joined to a substrate to be heated to a higher temperature whereby improved bonding is achieved while at the same time minimizing deteriorations and/or odor from the other melt, maintained at a lower temperature.

The deckle means, whether the external deckle bars, the internal deckle rods or a combination thereof, are so positioned onto outlet slots that offset end edges result in the extruded sheets thereby greatly reducing and/or eliminating edge build-up. The amount of offset required between the adjacent end edges of the outlet slots to avoid edge build-up depends upon a relatively large number of complex factors, which may be summarized by stating that the amount of offset depends upon the amount of neck-in occurring for a given thermo-extrudable material at given operating conditions before such material solidifies or reaches a support, such as a substrate. For example, when the thermo-extrudable material forming both melts is polyethylene, the end edges of the outlet slots are deckled so as to be offset from each other about 0.125 to about 0.375 inch (one-eighth to three-eighths inch) and preferably 0.25 inch. Other thermo-extrudable materials require different offset end edges to avoid edge build-up and the exact amount thereof is readily determined by simple observation during operation. The deckle means of the invention are easily adjustable to provide various amounts of edge offset during operation of the die so that an operator can readily adjust the same as required to substantially eliminate edge build-up during coextrusion of any given combination of thermo-extrudable materials.

In its method embodiments, the invention generally comprises extruding at least two separate melts in the form of flat streams or sheets in spaced apart but closely adjacent position arranged so that their respective side edges are offset or staggered from each other, contacting and bonding such separate molten sheets to one another and/or to a substrate and cooling the bonded melt sheets into a multilayer composite film. The extruded melt may be of the same thermo-extrudable material or of different thermo-extrudable materials. The offset arrangement of their end edges substantially reduces or eliminates edge build-up in the solidified composite film so that substantially no trimming at the extruder is required. Bonding of the molten sheets to each other or to a substrate occurs by contact between the materials to be bonded, with or without pressure urging such materials closer together. Coextrusion of two layers wherein the layers are combined outside the die substantially eliminates all pin holes from the composite film for improved physical and chemical properties.

As shown in FIG. 11, the method of the invention is practiced with a relatively simple extrusion setup. A pair of supply bins $B_1$ and $B_2$ are filled with the desired thermo-extrudable materials. Each of the supply bins $B_1$ and $B_2$ are operationally connected to separate extruder means $E_1$ and $E_2$ respectively, for conversion of the thermo-extrudable material in each of the bins to melts. Of course where the same material is to be coextruded, only one extruder is necessary. A dual outlet slot die means 111 is suitably connected to each of the extruder means $E_1$ and $E_2$ by flexible coupling adapters 112 and 112'. The die means 111 is preferably one of the constructions discussed in conjunction with FIGS. 1 through 10, however, other dies capable of producing at least two closely adjacent melt streams may also be utilized.

The die means 111 extrudes two separate closely adjacent molten melt streams $M_1$ and $M_2$ respectively. A pair of rolls 115 and 116 are positioned a relatively short distance below die means 111 and relatively close to one another so as to define a bonding nip N-1 therebetween. Roll 115 is provided with a heat control means 117 that maintains the surface of roll 115 a temperature substantially below the temperature of the melt stream $M_1$ so that upon contact therewith, the melt stream solidifies. A roll having such heat control means is generally composed of metal and is referred to as a chill roll. Roll 116 is provided with a conventional adjustment means A for selectively moving toward and away from roll 115 for the application of bonding pressure therebetween and is generally a rubber-covered roll. The rolls 115 and 116 are conventionally mounted for rotation toward one another as shown, and are so positioned below die means 111 so that melt stream $M_1$ contacts the downrunning surface of roll 115 while melt stream $M_2$ contacts the downrunning surface of roll 116. As the melt streams $M_1$ and $M_2$ travel with their respective roll surfaces toward nip N-1, they contact one another and bond to each other to form a composite multilayer structure or web W. Since only one of the rolls, i.e. 115, is cooled, melt stream $M_1$ solidifies first on the surface thereof in contact with such roll while the other surface thereof remains somewhat molten for improved bonding with the other melt stream $M_2$. After initial contact of the melt streams to one another, as at nip N-1, they form a composite partially molten web structure that wraps roll 115 for a substantial portion of its periphery whereby the entire composite structure is solidified into a composite web W. A plurality of guide rolls 118 are positioned downstream of the nip N-1 so as to define a somewhat serpentine-like path of web travel through air to a take-up roll 119. The take-up roll 119 winds the web W onto a suitable core so as to form a suitable diameter roll composed of web W for storage or use as desired. In certain embodiments, the guide rolls are provided with adjustment means, such as A on roll 116, to selectively vary their respective positions and thereby stretch or orientate the formed composite web W.

FIG. 12 illustrates another setup suitable for the practice of the invention whereby a die means 111a extrudes two closely adjacent but spaced-apart molten melt streams $M_1$ and $M_2$ that have their respective side edges offset from one another so as to avoid edge build-up. A pair of chill rolls 115' and 115'' are positioned in a spaced-apart side-by-side relation below and to one side of die means 111a. As the melt streams $M_1$ and $M_2$ travel downwardly, they pass an air jet means AJ, aimed to impinge pressurized air or the like onto the periphery of roll 115'. Air jet AJ forces the two molten melt streams $M_1$ and $M_2$ into contact with each other just as they are approaching the downward running surface of roll 115'. As shown, the inner surface of melt stream $M_2$ comes into direct contact with the cooled surface of roll 115' while the inner surface of melt stream $M_1$ bonds to the outer surface of melt stream $M_2$. The so-formed partially molten composite structure wraps roll 115' for a distance sufficient to substantially solidify at least a portion of melt stream $M_2$. It is then passed to the other chill roll 115'' so that the opposite side of the composite, i.e. the outer surface of melt stream $M_1$ contacts the cooled surface of roll 115'' and solidifies the same. The contiguous surfaces between melt streams $M_1$ and $M_2$ form a tightly adhering bond because such surfaces remain at least partially molten over a considerable time and distance allowing excellent bonding to occur. The solidified web W is then guided to a take-up station or the like as desired.

FIG. 13 illustrates an extrusion-coating setup suitable for practice of the invention. A suitable substrate supply S feeds a substrate $S_1$ over a plurality of guide rolls 118' and past an optional pre-treatment means $P_T$ for rendering the substrate more receptive to bonding with molten melt streams. An exemplary form of a pre-treatment means comprises a pair of opposing electrodes positioned on either side of the traveling substrate and operationally connected to a suitable high-frequency alternating electrical potential so that a corona discharge is produced therebetween and impinges upon the surfaces of the substrate. Another exemplary form of a pre-treatment means comprises a radiant heat means that heats the passing substrate to a desired temperature. The substrate is selected from a wide variety of materials and includes, for example, various types and grades of paper, metal foils, plastic films, fabrics, cloth, leather and other various synthetic, natural and/or man-made materials.

The substrate $S_1$ is then guided over a rubber-covered roll 116' having an adjustment means A for selective movement in the directions indicated by the double-headed arrow. The die means 111b is positioned above roll 116' so that one of the melt streams $M_1$ extruded therefrom intersects the downrunning surface of roll 116' and contacts the substrate $S_1$ thereon. The other melt stream $M_2$ is extruded in a closely adjacent but spaced-apart relation from stream $M_1$ and contacts the downrunning surface of chill roll 115', which is positioned along a parallel horizontal axes with roll 116 and in relatively close-running relation therewith so as to define a bonding nip N-2 therebetween. As the rolls 115' and 116' rotate toward one another, the molten melt streams $M_1$ and $M_2$ are brought into contact with each other under pressure so that a composite structure forms. It will be noted that the melt stream directly bonded to the substrate does not come into direct contact with a cooling surface, i.e. chill roll 115', so as to remain in its essentially molten state for a period of time during its travel over rolls 116' and 115' so as to obtain improved bonding between melt stream $M_1$ and the substrate $S_1$. Melt stream $M_2$ is chilled or cooled along its outer surface while its inner surface remains relatively molten for bonding with the inner surface of stream $M_1$. Of course, melt streams $M_1$ and $M_2$ may be extruded at different temperatures, say with a difference of up to about 200° F. wherein stream $M_1$ is at a higher temperature than stream $M_2$. In this manner, stream $M_1$ is at a sufficiently high temperature for improved bonding while stream $M_2$ is molten but at a sufficiently lower temperature to avoid deterioration and/or vaporization or odor problems. The formed composite structure of the substrate $S_1$ coated with a multilayer web W is then guided over a guide roll 118" provided a four-way adjustment means A' for selective tensioning of the composite structure. The composite web structure is then guided to a suitable take-up station T for storage or use as desired.

FIG. 14 illustrates a modified form of a bonding setup for use in the practice of the invention. A die means 111c is pivotally mounted so as to be capable of extruding at an angle to the vertical as shown, or pivoted to extrude along a vertical plane as desired. The die means 111c extrudes a pair of closely adjacent melt streams $M_1$ and $M_2$ downwardly into a liquid bath $L_C$ having a cooling liquid L therein. An air jet AJ is mounted adjacent the liquid bath so as to impinge air on the outer surface of melt stream $M_1$ and force it into contact with melt stream $M_2$ prior to the liquid bath. Suitable guide rolls 118a guide the forming web through the liquid bath for a distance sufficient to solidify individual melts and form a solidified web. Another guide roll 118b guides the composite solidified web W upwardly out of the liquid bath and past a pair of wiper means $L_D$, such as conventional doctor blades for removing any adhering liquid from the composite web W, and to a further station, such as a tempering oven, a take-up means, or the like. The liquid L may comprise cooled water or may include chemicals, for example, for sensitizing the composite surface for reception of printing ink or the like.

FIG. 15 shows one side of a solidified film F having an edge bead EF formed by prior art dies. As can be seen, the edge bead EF is substantially thicker than the other film portion and must be trimmed at the extruder so that a uniform caliber of film can be obtained for further processing.

FIG. 16 illustrates one side of a composite multilayer film F formed in accordance with the invention and comprised of film $F_1$ and film $F_2$, each formed of melt streams $M_1$ and $M_2$, respectively. It will be noted that the end edges $EF_1$ and $EF_2$ of each respective film have almost no visible bead so that extruder trimming is substantially eliminated.

As will be appreciated, there are two types of trim in producing commercial flat films. First, there is a trim at or on the extruder itself to eliminate edge beads and associated irregularities. With an average 60 inch film width, the extruder trim is approximately one inch on each side or about 3.3 percent trim. With coextrusion dies producing a multilayered film having each layer composed of a different thermo-extrudable material, this trim is pure waste and cannot be recycled. However, with a die assembly constructed in accordance with the principles of the invention, this waste is substantially eliminated and corresponding economic advantages are realized. The second trim occurs downstream of the extruder and comprises approximately a one half inch trim on each side of the film.

Modifications, variations and changes from described preferred exemplary embodiments may be made without departing from the spirit and scope of the novel concepts of the invention.

I claim as my invention:

1. A coextrusion flat film die assembly for thermo-extrudable materials, comprising:
    a die body of a given length and having at least two separate melt inlets for receiving a separate melt of said thermo-extrudable materials;
    at least two manifold chambers positioned within said die body and being substantially coextensive with said die body, each of said chambers being in communication with one of said melt inlets;
    means for separating said manifold chambers from each other throughout the given length of said die body;
    at least two separate elongated relatively narrow first melt flow passages substantially coextensive with said die body, each of said first melt flow passages being in communication with a separate manifold chamber for relatively coarse melt flow control;
    at least two separate elongated relatively narrower second melt flow passages substantially coextensive with said die body, each of said second melt flow passages being in communication with a separate first melt flow passage for relatively fine melt flow control;
    at least two separate melt outlet slots substantially coextensive with said die body and having a relatively narrow width dimension, each of said outlet slots communicating with one of said second melt flow passages and each being defined by a substantially immovable inner wall and a relatively movable outer wall, means associated with each of said outlet slots for selectively varying the width dimension of each slot; and deckle means associated with each of said outlet slots affirmatively positioning side edges of adjacent slots in offsetting positions relative to each other.

2. A coextrusion flat film die assembly for thermo-extrudable materials, comprising:

a die body of a given length and having at least two separate melt inlets for receiving a separate melt of said thermo-extrudable materials;

at least two manifold chambers positioned within said die body and being substantially coextensive with said die body, each of said chambers being in communication with a separate melt inlet;

means for separating said manifold chambers from each other throughout the given length of said die body;

at least two separate elongated relatively narrow first melt flow passages substantially coextensive with said die body, each of said first melt flow passages being in communication with a separate manifold chamber for relatively coarse melt flow control;

at least two separate elongated relatively narrower second melt flow passages substantially coextensive with said die body, each of said second melt flow passages being in communication with one of said first melt flow passages for relatively fine melt flow control;

at least two separate melt outlet slots substantially coextensive with said die body and having a relatively narrow width dimension, each of said outlet slots communicating with one of said second melt flow passages and each being defined by a substantially immovable inner wall and a relatively movable outer wall;

means associated with each of said outlet slots for selectively varying the width dimension of said slot;

deckle means associated with each of said outlet slots positioning the side edges of adjacent slots in offset position; and heating means associated with said body for providing an independently selected temperature to each of said separate melts throughout its flow in the die body.

3. A coextrusion flat flim die assembly for thermo-extrudable materials comprising, a pair of die body portions of a given length, each of said die body portions having:

an inner and an outer wall;

a separate melt inlet extending from said outer wall inwardly for receiving a separate melt of said thermo-extrudable material;

a manifold chamber extending from said inner wall to said melt inlet and having a lower boundary terminating inside the plane of said inner wall;

a pre-land surface joining said lower boundary of the manifold chamber and extending away from said manifold chamber substantially parallel to the plane of said lower boundary;

a final land surface joining a lower boundary of said pre-land surface and extending away therefrom along a plane between the plane of said inner wall and the plane of said pre-land surface;

a relatively deep groove extending from said outer wall inwardly toward said pre-land surface and terminating prior to said pre-land surface;

at least one threaded bore extending from said outer wall into said groove;

a bolt threaded into each of said bores for bearing against a groove wall below said bore;

a centerplate member positioned between said die body portions for separating said manifold chambers, pre-land surfaces and final land surfaces of each body portion into separate melt flow passages;

opposite surfaces of said centerplate member and said final land surfaces defining a pair of closely adjacent but separate offsetting outlet slots giving into space beyond the die; and heating means associated with each of said melt flow passages for independently regulating the temperature of each melt throughout a flow passage.

4. A coextrusion flat film die assembly as defined in claim 3, including deckle means mounted in working relation with the outlet slots and operating to offset adjacent side edges of said slots.

5. A coextrusion flat film die assembly for thermo-extrudable materials comprising, a pair of die body portions of a given length, each of said die body portions having:

an inner and an outer wall;

a separate melt inlet extending from said outer wall inwardly for receiving a separate melt of said thermo-extrudable material;

a manifold chamber extending from said inner wall to said melt inlet and having a lower boundary terminating inside the plane of said inner wall;

a pre-land surface joining said lower boundary of the manifold chamber and extending away from said manifold chamber substantially parallel to the plane of said lower boundary;

a final land surface joining a lower boundary of said pre-land surface and extending away therefrom along a plane between the plane of said inner wall and the plane of said pre-land surface;

a relatively deep groove extending from said outer wall inwardly toward said pre-land surface and terminating prior to said pre-land surface;

at least one threaded bore extending from said outer wall into said groove;

a bolt threaded into each of said bores for bearing against a groove wall below said bore;

a centerplate member positioned between said die body portions for separating said manifold chambers, pre-land surfaces and final land surfaces of each body portion into separate melt flow passages;

opposite surfaces of said centerplate member and said final land surfaces defining a pair of closely adjacent but separate offsetting outlet slots giving into space beyond the die;

heating means associated with each of said melt flow passages for independently regulating the temperature of each melt throughout a flow passage;

including deckle means mounted in working relation with the outlet slots and operating to offset adjacent side edges of said slots, said deckle means comprise a deckle carrier member mounted on the die body below the outlet slots for movement along the length of the die in a cross-machine direction and a deckle bar having first and second stepped portions, wherein said first step blocks a part of one outlet slot and the second step portion blocks a different portion of another outlet slot.

6. A coextrusion flat film die assembly as defined in claim 4 wherein the deckle means comprise a pair of deckle rods, each extending from the die body outer wall into the separate melt flow passages above the outlet slots for a different distance so that said outlet slots have adjacent offset side edges.

7. A coextrusion flat film die assembly as defined in claim 4 including a plurality of deckle means mounted in working relation with the outlet slots to define a plurality of ribbon-like slots, each ribbon-like slot having side edges offset from adjacent ribbon-like slot side edges.

8. A coextrusion flat film die assembly as defined in claim 3 wherein the centerplate member is a rigid smooth straight member and the heating means is in the centerplate member.

9. A coextrusion flat film die assembly as defined in claim 3 wherein the threaded bores in one die body portion are alternatingly staggered in relation to the threaded bores in the other die body portion, whereby reducing hills and valleys in composite extruded film so that a substantially uniform caliber of film is obtained.

10. A coextrusion flat film die assembly as defined in claim 3 wherein the heating means provides different temperatures to each of the melts ranging from about 0° to 200° F.

11. Means for flat film extrusion of thermoextrudable materials comprising; an elongated body provided with at least two separate melt passages, each passage having a feed end, a manifold chamber, a pre-land surface and a final land surface terminating in an outlet slot, said outlet slots being positioned adjacent to each other, means for feeding a thermo-extrudable material into each of said passages, means for heating said thermo-extrudable material in each of said passages to an individual temperature and deckle means associated with each of said outlets closing portions of adjacent side edges of said outlets in offset positions.

12. A die for extruding a thermoplastic sheet material comprising:
means defining a plurality of outlet slots elongated in a cross-machine direction;
said slots being spaced from each other transversely of said cross-machine direction;
a plurality of manifold chambers for supplying plastic melt to said slots;
heating means associated with each of said manifold chambers and said outlet slots for independently regulating the temperature of the plastic melt in each of said chambers and outlet slots, including a plurality of heaters in heat relation to said die, and each of said heaters being independently regulated to supply heat to the predetermined portion of the die, said heaters including as one feature separately controlled heaters disposed in a cross-machine direction.

13. A die assembly as defined in claim 12 including deckle means mounted in working relation with the outlet slots and offsetting adjacent side edges of said slots.

14. A die as recited in claim 13 wherein the deckle means comprise at least a pair of deckle rods extending into the die in a cross-machine direction, said deckle rods being above and in spaced relation with said outlet slots, one rod being associated with each outlet slot.

15. A die for extruding a thermoplastic sheet material comprising:
means defining a plurality of outlet slots elongated in a cross-machine direction;
said slots being spaced from each other transversely of the cross-machine direction;
a plurality of manifold chambers for supplying plastic melt to said slots:
heating means associated with each of said manifold chambers and said outlet slots for independently regulating the temperature of the plastic melt in each of said chambers and offset slots;
including deckle means mounted in working relation with the outlet slots to offset adjacent side edges of said slots,
wherein the deckle means comprise a deckle carrier member mounted on the die body below the outlet slots for movement along the length of the die in a cross-machine direction and a deckle bar having first and second step portions, wherein said first step portions blocks a part of one outlet slot and the second step portion blocks a different portion of another outlet slot.

16. A die for extruding a thermoplastic sheet material comprising:
means defining a plurality of outlet slots elongated in a cross-machine direction;
said slots being spaced from each other transversely of said cross-machine direction;
a plurality of manifold chambers for supplying plastic melt to said slots;
heating means associated with each of said manifold chambers and said outlet slots for independently regulating the temperature of the plastic melt in each of said chambers and outlet slots, including a plurality of heaters in heat relation to said die, and each of said heaters being independently regulated to supply heat to the predetermined portion of the die,
wherein a plurality of threaded bores extend from the outside of the die toward said outlet slots, a corresponding plurality of bolts threaded into said bores to regulate the opening of the outlet slots, wherein the bores and the bolts are alternately staggered relative to each other on opposite sides of the die.

17. A die for extruding thermoplastic sheet material comprising:
means defining a plurality of slots elongated in a cross-machine direction, said slots being spaced from each other transversely of said cross-machine direction;
a plurality of manifold chambers for supplying plastic material to said slots;
deckle means associated with said slots which put at varying different positions at least one edge of each of said slots whereby edge beads in said sheet extruded from each of said slots will be offset with respect to the edge beads in the sheet extruded from the other of said slots.

18. A die as defined in claim 17 including deckle means mounted in working relation with the outlet slots to offset adjacent side edges of said slots.

19. A die as defined in claim 18 wherein the deckle means comprise a deckle carrier member mounted on the die body below the outlet slots for movement along the length of the die in a cross-machine direction and a deckle bar having first and second stepped portions, wherein said first step blocks a part of one outlet slot and the second step portion blocks a different portion of another outlet slot.

20. A die as defined in claim 18 wherein the deckle means comprise a pair of deckle rods, each extending from the outer wall of the die into the area between the manifold chambers and the outlet slots, each rod extending into the die a different distance so that said outlet slots have adjacent offset side edges whereby the film at respectively corresponding edges of two adjacent slots comes out from the die in respectively offset positions.

21. A die as defined in claim 19 including a plurality of deckle means mounted in working relation with the outlet slots to define a plurality of ribbon-like slots, each ribbon-like slot having side edges offset from adjacent ribbon-like slot side edges.

22. The die recited in claim 17 and further including a plurality of heating means for regulating the temperature of the plastic melt in the manifold putting relatively different amounts of heat in different streams and also in different positions over the width of an individual stream.

23. The die recited in claim 17 wherein the die is comprised of at least two die portions,
a centerplate member positioned between said die portions for separating the manifold chambers and slots into separate melt flow passages,
said centerplate member being relatively thin to allow the slots to be closely spaced relative to each other, and extending in the outlet direction of the die all the way to the outlet end of the die to separate the slots in the outlet end.

24. The die recited in claim 17 and including pre-land surfaces in fluid communication with each of said manifold chambers and downstream therefrom,
said die further including final land surfaces in fluid communication with each of said pre-land surfaces and the outlet slots, said final land surfaces being downstream of said pre-land surfaces, and pre-land surfaces, land surfaces and outlet slots all having a common plane surface along the same side of all three and being in generally streamline passages.

* * * * *